United States Patent Office 2,954,675
Patented Oct. 4, 1960

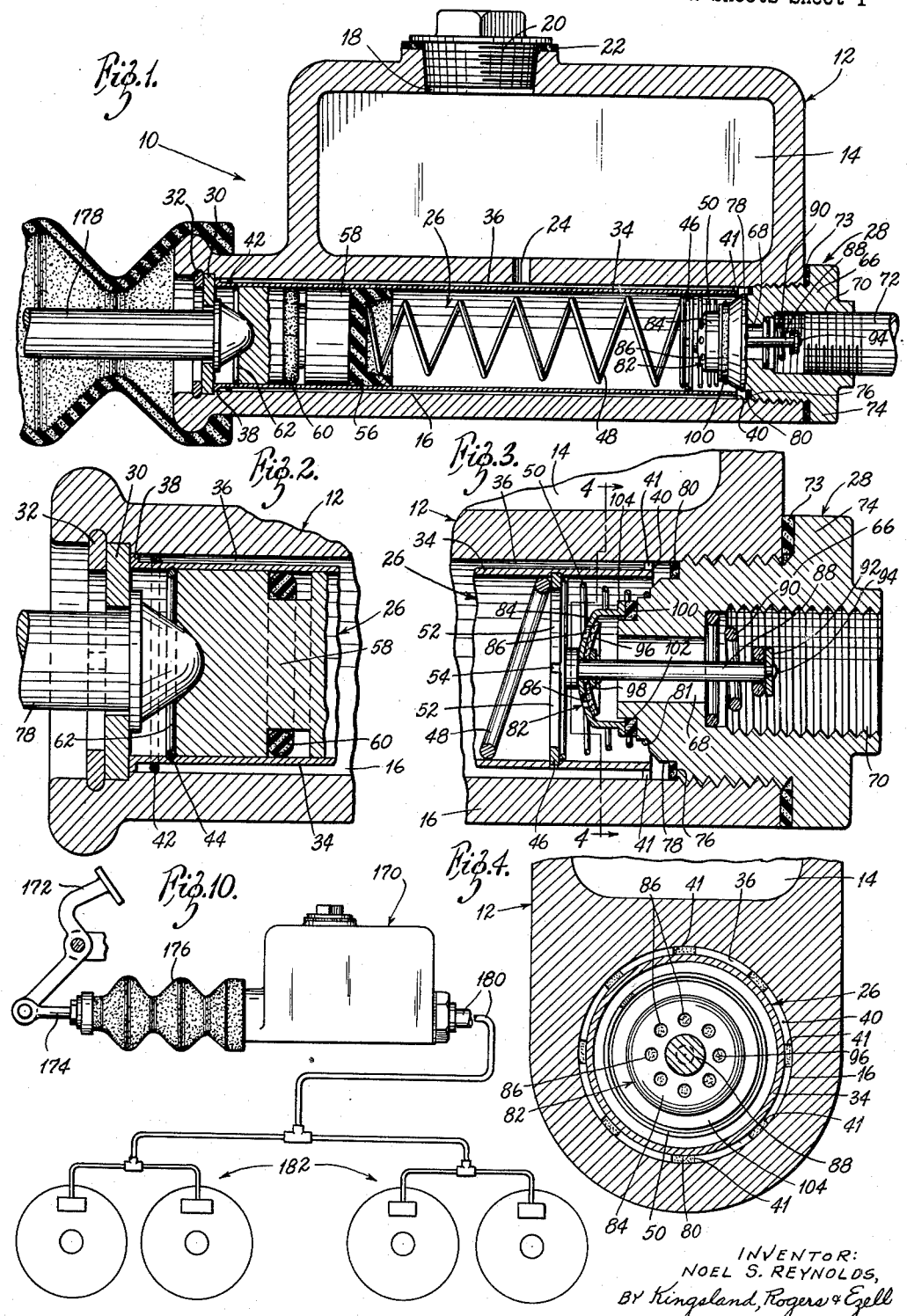

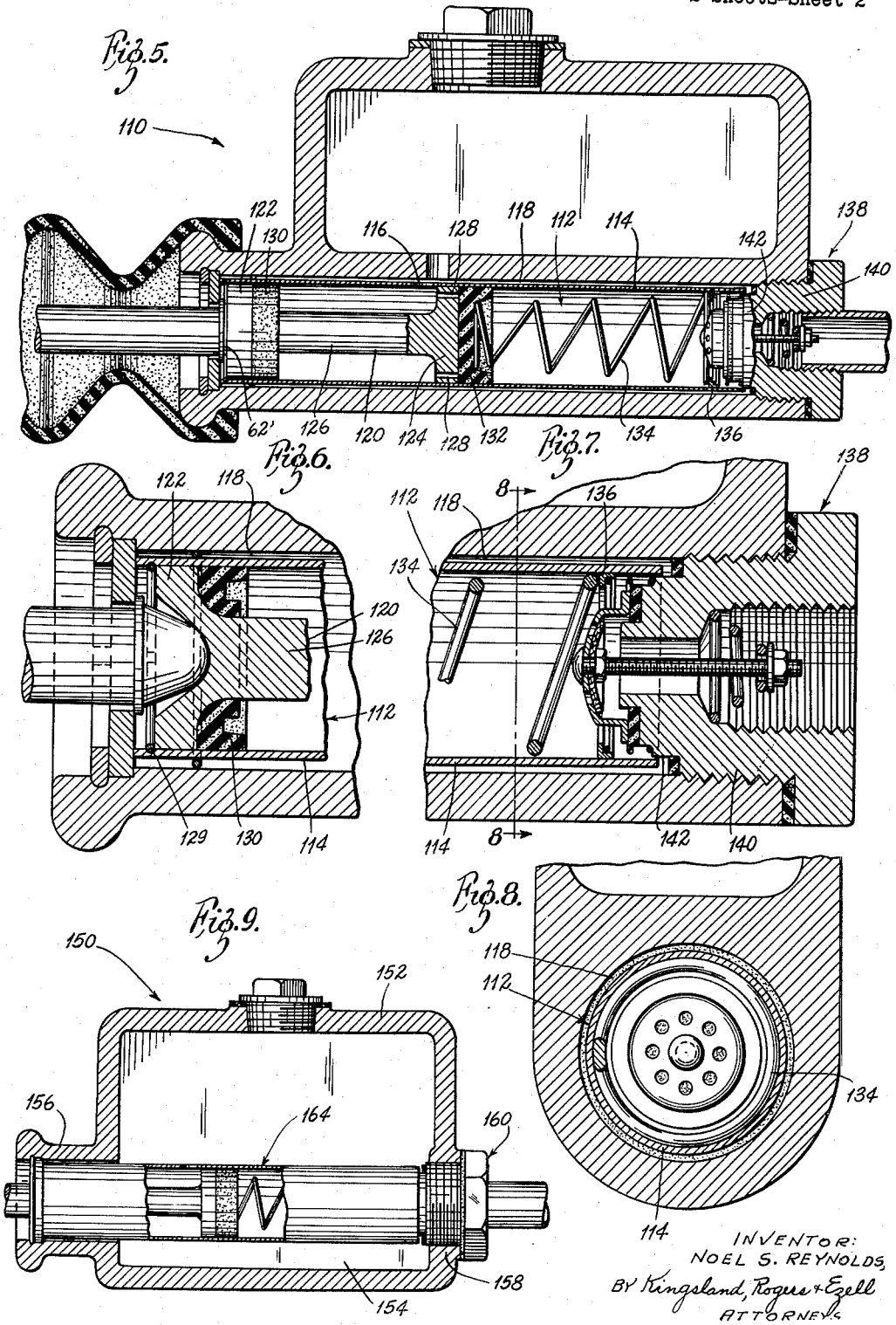

2,954,675

HYDRAULIC MASTER CYLINDER

Noel S. Reynolds, 636 Sherwood Drive, Webster Groves 19, Mo.

Filed Nov. 4, 1955, Ser. No. 544,871

5 Claims. (Cl. 60—54.6)

The present invention relates generally to hydraulic actuating systems, and more particularly to improved master cylinders incorporating novel floating sleeve arrangements for control of communication between a reservoir and a pressure cylinder.

Briefly, the basic invention contemplates a master cylinder housing of generally well-known type including a reservoir and containing a pressure cylinder. The cylinder comprises a tubular sleeve having limited axial movement within the housing. The sleeve contains a piston movably biased toward one end, the reaction force of the biasing element being absorbed within the sleeve itself. An annular seat is provided within the housing opposite the discharge end of the sleeve to be engaged by the latter when the piston, and hence the sleeve, is moved toward the discharge end of the housing. Thus, advancement of the piston for a pressure stroke is effective to close off communication between the interior of the sleeve and the reservoir and, at the same time, to establish a pressure-tight connection between the sleeve and the pressure-operated system connected therewith.

It is an object of the invention to provide a novel master cylinder for pressure-operated hydraulic systems which incorporates improved means both for venting the system during periods of inactivity and for the compensating replacement of fluid lost from the system.

It is another object of the invention to provide a novel master cylinder arrangement which incorporates a substantially liquid-tight piston of relatively short length, thereby permitting a high ratio of piston stroke to length of cylinder.

It is another object of the invention to provide a novel master cylinder arrangement which includes a floating cylinder assembly adapted for a valving function and comprising a tubular sleeve containing a movable piston and a compressed spring.

It is another object of the invention to provide an improved master cylinder arrangement which can be achieved by comparatively simple modification of well-known assemblies.

It is another object of the invention to provide a novel master cylinder arrangement which incorporates a floating cylinder assembly having an apertured piston for rear venting of the pressure cylinder upon retraction of the piston from its pressure stroke.

It is another object of the invention to provide a master cylinder arrangement in which a movable pressure cylinder is disposed in a reservoir for immersion in fluid contained therein.

The foregoing, along with additional objects and advantages, will be apparent from the following description of specific embodiments of the invention, as illustrated in the accompanying drawings, in which:

Figure 1 is a vertical sectional view of a brake master cylinder conforming to the present invention, some elements being shown partly in elevation and partly broken away to reveal details of construction;

Figure 2 is an enlarged fragmentary sectional view showing the actuating end of the brake master cylinder of Figure 1 with added clarity of detail;

Figure 3 is an enlarged fragmentary sectional view showing the discharge end of the brake master cylinder of Figure 1 with added details of structure;

Figure 4 is a fragmentary vertical section taken generally along the line 4—4 of Figure 3;

Figure 5 is a vertical sectional view similar to Figure 1, but showing a modified form of brake master cylinder conforming to the present invention;

Figure 6 is an enlarged fragmentary sectional view showing the actuating end of the brake master cylinder of Figure 5 with added clarity of detail;

Figure 7 is an enlarged fragmentary sectional view showing the discharge end of the brake master cylinder of Figure 5 with added details of structure;

Figure 8 is a fragmentary vertical section taken generally along the line 8—8 of Figure 7;

Figure 9 is a vertical sectional view similar to Figures 1 and 5, but showing a further modified from of brake master cylinder conforming to the present invention; and Figure 10 is a schematic representation of a typical hydraulic braking system incorporating a brake master cylinder of the present invention.

Referring to the drawings in greater detail, and first to Figures 1 through 4, the numeral 10 designates generally one form of master cylinder constructed in accordance with the teachings of the present invention. The master cylinder 10 comprises a main housing 12 formed to define a reservoir portion 14 and a cylinder portion 16, the former surmounting the latter as clearly illustrated in Figure 1. The reservoir portion is provided with a filler opening 18 which is normally closed by a plug 20 made fluid tight by a gasket 22. A passage 24 is provided in the bottom of the reservoir portion 14 so as to communicate the same with the cylinder portion 16.

A floating cylinder assembly 26 disposed within the cylinder portion 16 is movably retained therein by a plug assembly 28 at the discharge end of the cylinder portion 16 and by a retaining washer 30 and snap ring 32 at the opposite or actuating end of the cylinder portion 16.

As clearly shown in Figure 1, the assembly 26 includes a tubular sleeve 34 having its principal outside diameter appreciably less than the inside diameter of the cylinder portion 16 of the housing 12. The resulting elongated annular space 36 is, of course, communicated to the reservoir portion 14 through the passage 24. The sleeve 34 is retained in substantially coaxial relationship with the housing portion 16 by means of flanges 38 and 40 formed at the actuating and discharge ends of the sleeve 34, respectively. The flange 38 may be continuous in form, but the flange 40, at the discharge end of the sleeve 34, is preferably provided with spaced openings or notches 41. The notches 41 are clearly indicated in Figure 3, and their spaced arrangement is illustrated in Figure 4. The diameter of the flanges 38 and 40 is such as to provide a smooth sliding fit between the sleeve 34 and the cylindrical wall of the housing portion 16. An O-ring 42 of resilient, compressible material, such as rubber, is disposed over the sleeve 34 just inwardly of its flange 38 so as to close this end of the annular space 36 against leakage while, at the same time, permitting free reciprocal movement of the sleeve 34.

The cylindrical inside surface of the sleeve 34 is smooth and unbroken, except for an annular groove 44 formed near the actuating end and an annular inwardly extending flange 46 provided near the discharge end. It is not required that the flange 46 be continuous, its function being to form a rest or stop for one end each of compression springs 48 and 50. It may take the form of a snap ring or, as in the illustrated embodiment, it may comprise a plurality of arcuate segments 52 spaced slightly apart as indicated at 54 and pressed or otherwise secured in place as indicated in Figure 3.

In addition to the sleeve 34, the cylinder assembly 26 includes the aforementioned compression spring 48, a flexible cup 56 of rubber, or other flexible material, a rigid solid-faced piston 58 provided with an O-ring 60, and a retaining snap ring 62. The arrangement of these elements is clearly illustrated in Figure 1, from which it will be observed that the piston 58 and the flexible cup 56 are juxtaposed so as to produce an efficient compressive action as they are moved toward the discharge end of the sleeve 34. The snap ring 62 functions as a limiting stop for the piston 58, and the compression spring 48 acts continuously to urge the cup 56 and piston 58 toward the ring 62, or away from the discharge end of the sleeve 34.

Directing attention now to the right hand end of the cylinder portion 16, as illustrated in Figures 1 and 3, the plug assembly 28 comprises a plug 66, which is threadably received in the housing 12 opposite the discharge end of the sleeve 34 and which is provided with a central passage 68 having an enlarged outer portion 70 threaded to receive a connecting pipe 72. A gasket 73 is provided between an outer flange 74 of the plug 66 and the adjacent face of the housing 12 so as to assure a fluid-tight joint.

The exterior threaded portion of the plug 66 terminates at its inner end in an annular shoulder 76 at which point the outside of the plug 66 reduces to form a short cylindrical portion 78 having a diameter slightly less than the inside diameter of the sleeve 34. The difference between these diameters is preferably of the order of a few thousandths of an inch for a reason to be explained hereinafter.

A gasket 80 of resilient material, such as rubber, is disposed against the shoulder 76 in position to be compressively engaged by the near end of the movable sleeve 34 when the latter is advanced toward the plug 66. Such movement of the sleeve 34 is opposed, however, by the relatively light compression spring 50 which is interposed between the stop flange 46 of the sleeve 34 and an intermediate shoulder 81 formed, as clearly illustrated, on the plug 66. It will be observed that the spring 50 acts, in the absence of a superior force against it, to move the floating cylinder assembly 26, including the sleeve 34, to a position wherein the actuating end of the latter abuts the retaining washer 30. Moreover, it will be observed that the relative dimensions of the sleeve 34 and the cylindrical portion 78 of the plug 66 are such as to leave a substantial gap therebetween when the assembly 26 is in the illustrated inoperative position.

The plug assembly 28 includes a two-way restricting valve 82 assembled with the plug 66. This valve 82 comprises a cup member 84 formed as clearly illustrated in Figures 1 and 3 of the drawing and provided with a series of apertures 86 as best shown in Figures 3 and 4. A headed stem 88 passes axially through the cup 86 so as to extend through the passage 68 and into the enlarged portion 70 of the plug 66 where it is provided with a conical compression spring 90 retained by a washer 92 secured to the end of the stem 88 by a peened over portion 94. A flexible flap 96 of rubber or like material is disposed within the cup member 84 so as to cover the apertures 86 as shown in Figure 3. The central portion of this flap or disc 96 is secure against the inside of the cup member 84 by means of a washer 98 affixed, as by welding or soldering, to the stem 88. A gasket 100 of resilient material, such as rubber, is disposed against an annular shoulder 102 formed on the plug 66 inwardly of the aforementioned shoulder 81 and serves as a seat for receiving a peripheral edge or lip portion 104 of the spring-biased cup member 84. Clearly, the arrangement of the valve 82 is such as to effect a predetermined pressure restriction to fluid flow in one direction and to offer very little restriction to flow in the other direction.

Figures 5 through 8 illustrate a modified form of master cylinder constructed in accordance with the teachings of the present invention. This master cylinder, generally designated by the numeral 110, differs from the previously described master cylinder 10 primarily in the arrangement of its floating cylinder assembly 112. Directing attention therefore first to the cylinder assembly 112 of the master cylinder 110, an elongated tubular sleeve 114 differs from the previously described sleeve 34 in having unflanged actuating and discharge ends, and also in being provided with an aperture 116 located somewhat nearer the actuating end than the discharge end so as to communicate the interior of the sleeve 114 with an annular space 118 corresponding to the previously mentioned space 36.

A spool-type piston 120 having a rear face 122 and a forward pressure face 124 interconnected by a bar-like portion 126 is slidably disposed within the sleeve 114. The forward face 124 is provided with spaced apertures 128, and it will be observed that when the piston 120 is in its illustrated position of rest, the relationship between the aperture 116 in the sleeve 114 and the forward pressure face 124 of the piston 120 is such as to communicate the space behind the face 124 with the annular space 118. As best shown in Figure 6, the aforementioned normal rest position of the piston 120 is established by abutment of the rear face 122 with a snap ring 129 removably retained in the sleeve 114 in a manner similar to that previously described in respect to the master cylinder 10.

A sealing member 130, preferably having a C-section as illustrated in Figure 6 and constructed of flexible rubber-like material, is disposed against the actuating face 122 to prevent fluid leakage therepast. In addition, a flexible cup-shaped member 132 is disposed with its base against the forward side of the pressure face 124 and with its circular wall extending toward the discharge end of the sleeve 114. A spring 134 of generally frustoconical shape has its smaller end disposed within the cup 132 and its opposite larger end disposed against a stop element 136, the latter being secured within the sleeve 114. Although the stop element 136 here illustrated takes the form of a ring member having an angle cross section and being press fitted into the sleeve 114, it will be obvious that stop elements of different form may be employed as previously discussed in respect to the construction of the master cylinder 10. Attention is directed to the relationship between the spacing of the apertures 128 in the pressure face 124 of the piston 120 and the diameter of the near end of the spring 134, wherein it will be observed that the spring diameter is less than the diametrical spacing of the apertures 128.

The master cylinder 110 includes a plug assembly 138 which, while generally similar to the corresponding assembly 28 in the master cylinder 10, differs therefrom particularly in having a plug 140 provided with a cylindrical portion 142 sized for a smooth sliding fit within the discharge end of the sleeve 114. Also, it will be observed from the illustration of Figure 7 that, notwithstanding the sleeve 114 being in its rest position, its discharge end remains engaged over the cylindrical portion 142. Although the plug assembly 138 differs in certain other respects from the plug assembly 28, the differences which appear are of no functional consequence and merely demonstrate equivalence of the parts. It will be understood therefore, that with the exception of the differences specifically mentioned above, the construction of the master cylinder 110 corresponds identically with the construction of the master cylinder 10.

Figure 9 illustrates a further modified form of master cylinder conforming to the teachings of the present invention. This master cylinder, designated generally by the numeral 150 includes a housing 152 which differs from the housings of the master cylinders 10 and 110 in defining an enlarged reservoir 154 arranged in a manher to eliminate the requirement for an auxiliary cylinder portion for containing a cylinder assembly such as the assemblies 26 and 112 above-described. Thus, the housing 152 has what may be termed an actuating boss 156 and a discharge boss 158. These bosses 156 and 158 have coaxial openings formed therein, the boss 158 being threaded to receive a plug assembly 160 which, in the illustrated device, is identical with the previously mentioned plug 138 in the master cylinder assembly 110. The opening through the boss 156 is identical with the actuating end of the cylinder portion 16 and the corresponding portion of the housing of the master cylinder 110. Arranged in this manner, it is evident that the housing 152 may accommodate a cylinder assembly 164 which is identical with the previously described cylinder assembly 112 in the master cylinder 110. It is apparent, then, that, except for the substitution of the housing 152, the master cylinder assembly 150 is identical with the master cylinder assembly 110 and includes identical parts. It is further evident that a housing of the general type designated by the numeral 152 may accommodate a cylinder assembly similar to the assembly 26 of the master cylinder 10 either by providing an inward extension to the boss 158, or by modifying the sleeve 34 in a manner to dispose the annular flange 40 radially inwardly instead of radially outwardly.

*Operation*

The master cylinders of the present invention find application in hydraulic braking systems of generally familiar type as illustrated in Figure 10. In this figure, a master cylinder 170 is shown with its actuating end connected to a brake pedal 172 by means of an actuating rod 174 provided with the usual dust boot 176. This actuating arrangement is common to the master cylinders above-described, each being provided with actuating rods corresponding to the rod 174 of the master cylinder 170. It will be observed that these actuating rods extend coaxially into the actuating ends of the respective housings so as to abut the adjacent ends of the movable pistons therein. The arrangement is clearly such that operation of a pedal such as 172 is effective to move the particular piston toward the discharge end of the associated housing.

To be more specific, and taking the master cylinder 10 as a first example, movement of the illustrated actuating rod 178 to the right effects like movement of the piston 58 to the right. As soon as the piston 58 is moved away from the snap ring 62, however, the loading force of the spring 48 is transferred from the ring 62 to the actuating rod 178. As a result, the spring force is no longer wholly absorbed within the sleeve 34 and the uncompensated force of the spring 48 against the flange 46 is effective to move the whole cylinder assembly 26 from the position illustrated in the drawing to a position wherein the discharge end of the sleeve 34 seats against the resilient gasket 80. It will be understood that the force exerted by the spring 48 easily overcomes the biasing force exerted by the relatively light spring 50 and is therefore sufficient to establish an efficient, non-leaking connection between the sleeve 34 and the apertured plug 66. Continued movement of the piston 58 and the associated cup 56 to the right will force hydraulic fluid under pressure developed by the advancing piston and cup through the apertures 86 in the two-way valve cup 84 so that the fluid deflects the disc 96 and enters the passage 68. From this point the pressurized fluid is conducted through a pipe 180 for distribution under pressure to a conventional set of hydraulically operated brakes designated generally by the numeral 182 in Figure 10.

Returning to consideration of the master cylinder 10, it is evident that as long as the actuating rod 178 is maintained in position to displace the piston 58 from the snap ring 62, the pressure-tight engagement of the sleeve 34 with the plug assembly 28 will be maintained. If, through damage or excessive wear of the gasket 80, leakage should occur at this point, it will obviously be limited by the aforementioned close fit between the sleeve 34 and the cylindrical surface 78 on the plug 66.

Upon eventual withdrawal of the rod 178, however, the piston 58 and cup 56 will be returned under action of the spring 48 to the positions illustrated in the drawing. Once more, then, the floating sleeve assembly 26 will be free to move away from the plug 66 under bias of the spring 50. Actually, since the pressure within the sleeve 34 will have dropped to zero or below due to the restricting action of the two-way valve assembly 82, the spring 50 has only to overcome the inertia of the assembly 26 and the very slight friction developed in moving it. In other words, there is no positive force which needs to be overcome in returning the assembly 26 to its rest position.

With the sleeve 34 no longer pressed against the gasket 80, it is clear that communication will be reestablished from inside the sleeve, past the cylindrical surface 76 on the plug 66, through the notches 41 in the flange 40 of the sleeve through the annular space 36 between the sleeve 34 and the cylinder portion 16, and finally through the passage 24 to the reservoir 14. The interior of the sleeve 34 being thus vented to the reservoir 14, it is evident that there will be a tendency for fluid to flow by gravity from the latter down into the sleeve 34. This will be particularly true when the interior of the sleeve 34 is partially evacuated due to the return of the piston 58 and cup 56 to their rest positions under the influence of the spring 48, and pending a slight lag in return of the hydraulic fluid which has previously been discharged into the pipe 72.

The return of fluid through the pipe 72 past the spring-loaded two-way valve 82 and back into the sleeve 34 is effected by the usual spring-biased pistons (not shown) incorporated in the conventional hydraulic brakes 114. This fluid is, of course, returned under sufficient pressure to displace the cup member 84 of the valve assembly 82 from the gasket 100 so that fluid may be readmitted into the sleeve 34. The spring 90 which biases the cup 84 towards its seat is effective, however, to maintain the braking system 114 filled with fluid under slight pressure so as to eliminate lost time and lost motion when it is desired again to apply the brakes. It is, of course, clear that any excess of fluid which may have descended from the reservoir into the sleeve 34 prior to full return of fluid from the pipe 72 will be itself returned to the reservoir 14 by the same path it descended. It will also be evident that volumetric variations in the fluid due to temperature changes, losses from the system and the like, will be accommodated by this intercommunication between the reservoir 14 and the sleeve 34.

The foregoing description of operation of the master cylinder 10 applies generally to operation of the master cylinders 110 and 150 as well. These latter master cylinders, however, being provided with perforated piston faces behind the compression cups 132, make use of the partial vacuum created by return movement of the piston 120 and cup 132 to introduce at least a portion of the compensating hydraulic fluid through the passages 128 and past the flexible cup 132. The fluid thus introduced into the pressure chamber of the sleeve 114 comes originally, of course, from the reservoir by way of the space 118 and the aperture 116 wherein to fill the space between the faces 122 and 124 of the piston 120.

Attention is directed to the fact that the rear compensation which is possible with the master cylinder 110 is in addition to the definite, albeit restricted, venting and compensating communication past the smooth-sliding centering engagement between the discharge end of the sleeve 114 and the cylindrical portion 142 of the plug 140.

Inasmuch as the master cylinder 150 is provided with a floating cylinder assembly 164 which is identical with the assembly 112 of the master cylinder 110, the functional operation of the master cylinder 150 is identical with that of the master cylinder 110.

Clearly, there have been provided master cylinders which fulfill the objects and advantages sought therefor.

It is to be understood that the foregoing description and the accompanying drawing are given by way of illustration and example. It is also to be understood that rearrangement of elements, substitution of parts, and changes in form of the elements, all of which will be obvious to those skilled in the art, are considered to be within the scope of the present invention, which is limited only by the claims which follow.

What is claimed is:

1. A master cylinder for a pressure-operated hydraulic system comprising, in combination, a housing defining a reservoir for hydraulic fluid and a cylindrical chamber in communication with said reservoir, means defining a discharge aperture in the chamber, said latter means including an annular seat surrounding said aperture, a cylinder assembly in the chamber, said cylinder assembly including a tubular sleeve coaxial with said chamber and aligned with said discharge aperture, said sleeve being disposed for axial movement in the chamber, resilient ring means disposed about said tubular sleeve adjacent the end remote from the discharge aperture, said resilient ring means making fluid-tight contact with both the tubular sleeve and the housing to provide a fluid seal therebetween while permitting substantially unrestrained axial movement of the sleeve relative to the chamber, said cylinder assembly further including spring-biased piston means in said sleeve, and means for advancing the cylinder assembly, including the spring-biased piston means, as a unit toward the discharge aperture to effect sealing engagement between the tubular sleeve and the annular seat.

2. The combination of claim 1 wherein the tubular sleeve is provided with stop means adjacent its respective ends for retaining the spring-biased piston means.

3. The combination of claim 1 wherein the movable sleeve has an actuating end and a discharge end and is provided with stop means adjacent its respective ends, and wherein the spring-biased piston means includes piston means and a compression spring, said spring being retained by the stop means adjacent the discharge end of the sleeve and acting continuously to urge the piston means into engagement with the stop means adjacent the actuating end of the sleeve.

4. The combination of claim 1 wherein the sleeve has a principal outside diameter less than the principal inside diameter of the elongated cylinder portion thereby providing an elongated annular space outside the sleeve and inside the cylinder portion, the intercommunication between the reservoir portion and the cylinder portion including a fluid passage communicating with a central portion of the elongated annular space, resilient sealing means disposed in said annular space between said fluid passage and one end of the sleeve for preventing leakage of fluid from the annular space, and a stationary gasket member disposed opposite the other end of the sleeve for selective seating of said other end of the sleeve thereagainst for cutting off communication between the reservoir and the interior of the sleeve.

5. The combination of claim 1 wherein the spring biased piston means include a piston disposed within the sleeve with a fluid-tight seal between the piston and the seal for preventing the flow of fluid past the piston in a direction away from the discharge aperture, and a compression spring connected between the piston and the sleeve so that when the piston is moved against the discharge opening it will act through the spring to effect said sealing engagement between the tubular sleeve and the annular seat.

References Cited in the file of this patent

UNITED STATES PATENTS

| | | |
|---|---|---|
| 1,892,707 | Ruegg | Jan. 3, 1933 |
| 2,156,205 | Swift | Apr. 25, 1939 |
| 2,160,075 | LaBrie | May 30, 1939 |
| 2,232,113 | Katcher | Feb. 18, 1941 |
| 2,232,349 | Swift | Feb. 18, 1941 |
| 2,258,034 | Schnell | Oct. 7, 1941 |
| 2,307,642 | Schnell | Jan. 5, 1943 |
| 2,313,273 | Schnell | Mar. 9, 1943 |
| 2,348,367 | Schnell | May 9, 1944 |
| 2,473,803 | LaBrie | June 21, 1949 |
| 2,663,540 | Erickson | Dec. 22, 1953 |
| 2,674,352 | Braun | Apr. 6, 1954 |
| 2,759,329 | Ponti | Aug. 21, 1956 |